United States Patent
Salzer et al.

(10) Patent No.: US 7,306,282 B2
(45) Date of Patent: Dec. 11, 2007

(54) TABLE UNIT

(75) Inventors: Uwe Salzer, Salem (DE); Hartmut Schürg, Schwäbisch Hall (DE)

(73) Assignee: Recaro Aircraft Seating GmbH & Co., Schwäbisch Hall (DE)

( * ) Notice: Subject to any disclaimer, the term of this patent is extended or adjusted under 35 U.S.C. 154(b) by 641 days.

(21) Appl. No.: 10/296,814

(22) PCT Filed: May 25, 2001

(86) PCT No.: PCT/EP01/05997

§ 371 (c)(1),
(2), (4) Date: Mar. 14, 2003

(87) PCT Pub. No.: WO01/92055

PCT Pub. Date: Dec. 6, 2001

(65) Prior Publication Data

US 2003/0159628 A1    Aug. 28, 2003

(30) Foreign Application Priority Data

May 31, 2000   (DE) .............................. 100 27 230

(51) Int. Cl.
*A47B 83/02* (2006.01)
*B60N 3/00* (2006.01)
*A47C 7/70* (2006.01)

(52) U.S. Cl. .................... 297/146; 297/145; 403/53

(58) Field of Classification Search ............. 108/44, 108/46, 6, 26, 45, 172, 115, 166, 167, 171; 297/190, 144, 145, 140, 146; 403/53, 57, 403/58, 52
See application file for complete search history.

(56) References Cited

U.S. PATENT DOCUMENTS

| | | | | |
|---|---|---|---|---|
| 1,837,826 A | * | 12/1931 | Mitchell et al. | 108/6 |
| 2,342,396 A | * | 2/1944 | Goddard | 403/53 |
| 2,619,395 A | * | 11/1952 | Kent | 108/38 |
| 3,632,161 A | * | 1/1972 | Arfaras et al. | 297/145 |
| 3,785,300 A | * | 1/1974 | Anderson | 108/44 |
| 4,359,004 A | | 11/1982 | Chappell | |
| 4,938,153 A | * | 7/1990 | Maes | 108/128 |
| 4,944,552 A | * | 7/1990 | Harris | 297/145 |

(Continued)

FOREIGN PATENT DOCUMENTS

DE           4343242           6/1995

(Continued)

*Primary Examiner*—Joe Edell
(74) *Attorney, Agent, or Firm*—Roylance, Abrams, Berdo & Goodman, L.L.P.

(57) ABSTRACT

A table unit for seats in vehicles, especially airplane seats, includes a first table element (10) provided with the functions of a table, and a second table element (12) provided with at least one other table function. Both table elements (10, 12) can be rotated relative to each other about a first pivotal axis (14) by a hinge (18, 20), and can be fixed in a predetermined position. Various table functions can be integrated in a single table unit since both table elements (10, 12) can be rotated about a pivotal axis (16) by another joint (20, 22), and can be fixed in a predetermined position. The possible table surface and position thereof can be varied in such that certain table functions are protected and service personnel can have access to them.

17 Claims, 4 Drawing Sheets

U.S. PATENT DOCUMENTS

| | | | |
|---|---|---|---|
| 5,078,056 A * | 1/1992 | McCauley | 108/115 |
| 5,425,313 A * | 6/1995 | Rowan | 108/65 |
| 5,547,247 A * | 8/1996 | Dixon | 297/145 |
| 5,649,734 A * | 7/1997 | Speis | 296/57.1 |
| 5,816,648 A * | 10/1998 | Baccili et al. | 297/159.1 |
| 5,876,092 A * | 3/1999 | An | 297/146 |
| 5,893,607 A * | 4/1999 | Trimnell | 297/170 |
| 6,513,443 B2 * | 2/2003 | Todd | 108/115 |
| 2002/0189508 A1 * | 12/2002 | Todd | 108/115 |

FOREIGN PATENT DOCUMENTS

| | | |
|---|---|---|
| DE | 19705754 | 8/1998 |
| GB | 2340389 | 2/2000 |
| JP | 63242751 | 10/1988 |
| JP | 2158437 A * | 6/1990 |

* cited by examiner

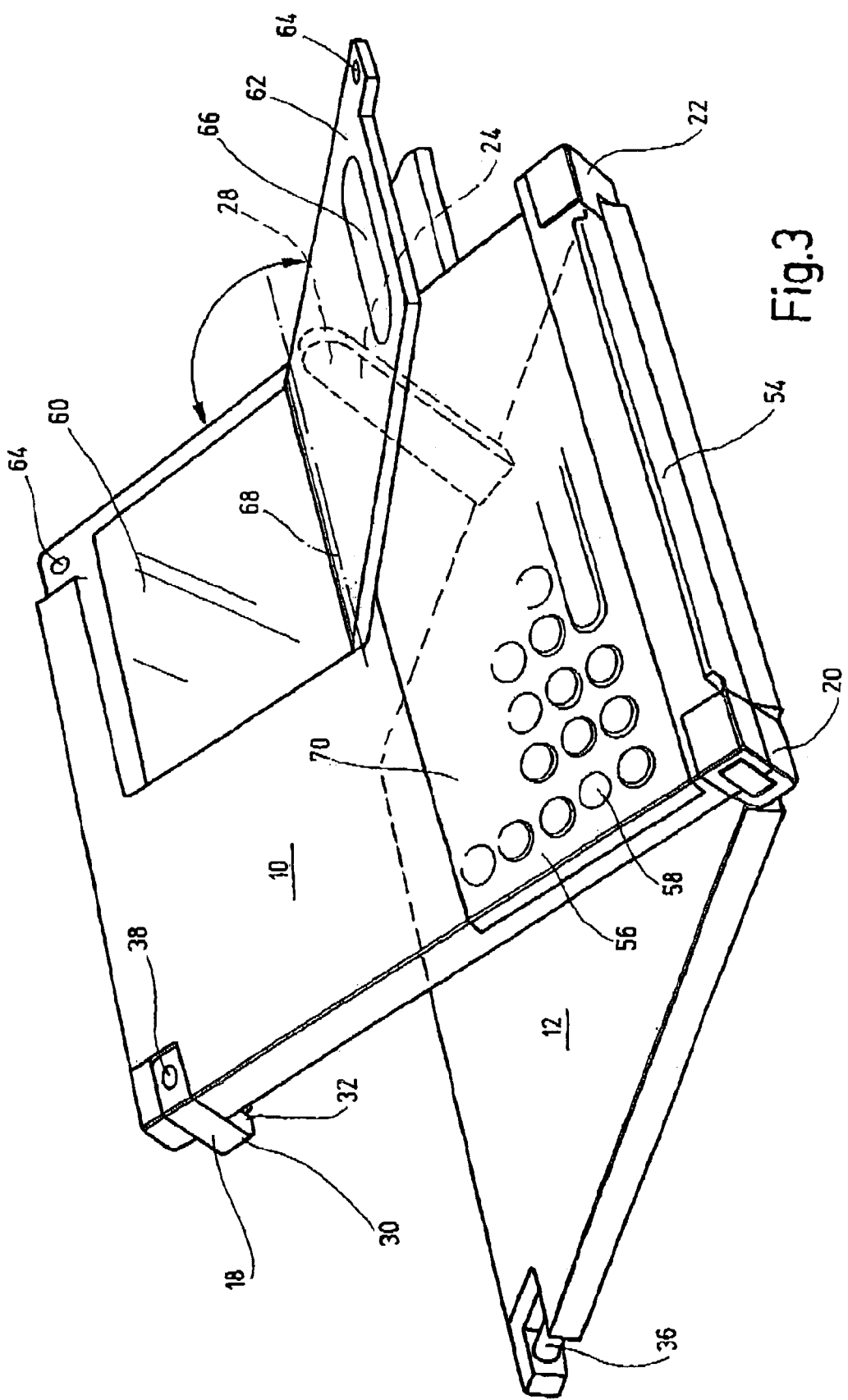

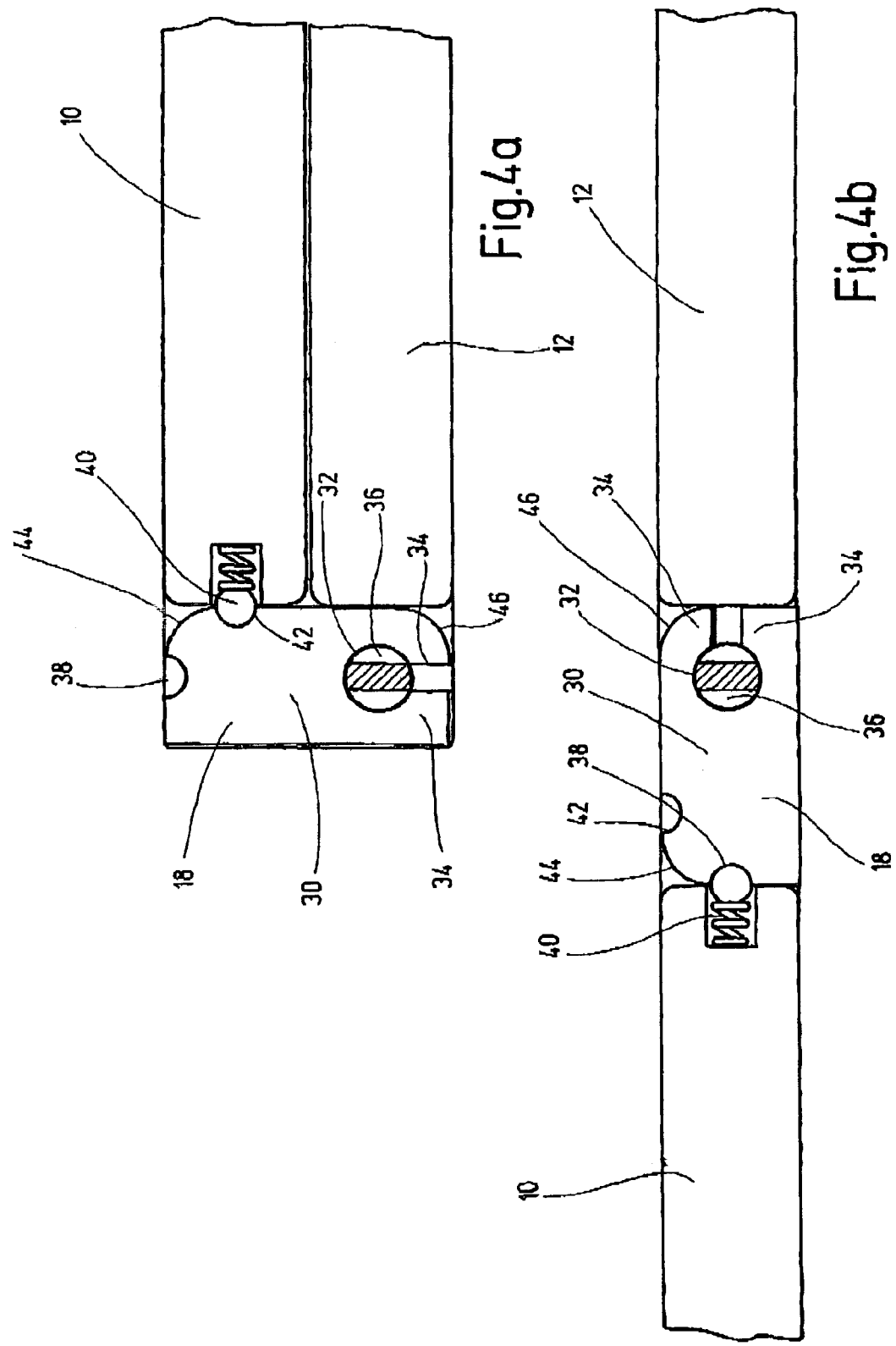

TABLE UNIT

FIELD OF THE INVENTION

The present invention relates to a table unit for vehicle seats, especially aircraft passenger seats, with one table element with an assignable table function and another table element with at least one other table function. The two table elements can rotate relative to one another around a first swivelling axis by at least one articulation, and can be fixed in definable positions.

BACKGROUND OF THE INVENTION

U.S. Pat. No. 5,547,247 discloses a generic table unit for vehicle seats with one table element having an assignable table function and with another table element having at least one other table function. The two table elements can be rotated relative to one another around a first swivelling axis by at least one articulation and can be fixed in definable positions. The two table elements can be rotated around another swivelling axis by at least one other articulation and can be fixed in definable positions. The known table unit can be stowed in the armrest of an aircraft passenger seat and can be removed from there. For stowing the table unit in the seat armrest, the two table units can be folded up onto one another in a space-saving manner around a common swivelling axis. In the extended state of use of the table unit, the two table elements can form one table and a function plane in the unfolded position. Furthermore, the two table elements which can be swivelled relative to one another are held on a folding-down swivelling arm on the seatback. The two table elements can be swivelled jointly around an essentially vertically extending swivelling axis of this arm, in order to swivel the entire table unit, whether in the unfolded or folded-up state, by the seat user towards or away from him. An inclined position and moreover swivelling motion from the horizontal initial position of one of the two table elements are not possible. This inability limits possible uses of the known table unit.

DE 197 05 754 A1 discloses a table unit and relates to a folding table for a seat in a vehicle for passenger conveyance. A display screen is integrated into the top of the folding table for implementing a table function. The display extends only over part of the table surface. The remaining part of the table surface can be used as a working surface. The table top has two table elements or parts which are made to be foldable towards one another around a common axis with the pertinent articulations. One part is used to accommodate the screen. The other part is used as a working surface. The part of the table top which accommodates the screen can be tilted into several rest positions relative to the part of the table top which is used as the working surface to allow the viewer a suitable angle for viewing the screen. When not in use, the table top can be lowered into a console which is used as the holding device for the table top. The console is formed in the known approach from the armrest of the seat itself. In spite of this additional adjustment possibility, the adjustment potential is limited as before. With this known table unit accordingly, different table functions can be implemented only within a limited framework.

SUMMARY OF THE INVENTION

Objects of the present invention are to provide improved table units for vehicle seats, especially aircraft passenger seats, which table units integrate different desired table functions in one table unit and vary the possible table surface and its position such that it provides an effective aid and facilitates eating.

According to the present invention, each swivelling axis is defined by two articulations located on the outside periphery on the table unit. Because one articulation made as a multiple joint is assigned both to first and second swivelling axes, various table functions can be integrated in the two table elements. Depending on which table element is unfolded by the user facing him, the respectively chosen table function is activated. The unneeded table functions remain in their removed state. This arrangement also has the advantage that they cannot be damaged. If, for example, one table element is used for eating, it is possible to move the other table element provided, for example, with a computer unit and a display as a table function into the position of non-use or storage such that they cannot be scratched by food residue or damaged by the like. The two table elements can lie flush on one another or can be unfolded next to one another with doubling of their table surfaces. Furthermore, as cannot be obtained in the prior art, the two table elements can be adjusted relative to one another in their tilt by the second swivelling axis and can be fixed by a fixing means. Even in the reclined position of the seat with the backrest tilted and with the table elements folded onto one another, one table element remains in its initial position and the table element facing the seat user can be moved into the corresponding inclined position over the other table element. The partial table surface tilted in this way then improves the readability of the respective information, for example in the form of magazine articles or books, since the respective page maintains a uniform distance to the viewer.

In one especially preferred embodiment of the table unit of the present invention, a table function can be assigned to each table element, especially in the form of a make-up area and/or a computer unit and/or a possibility for setting down food and/or a support for reading matter. Consequently, with only one table unit a host of objects can be achieved. The comfort for the users of the seat can be clearly increased without additional installation space having to be provided for the indicated table functions on the respective seat. In one advantageous further configuration of the table functions integrated in the table unit, the respective function unit can be covered by a cover such that it forms one part of the flat table surface, in order not to adversely affect the actual table function.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure:

FIG. 3 is a perspective view of the table unit of FIGS. 1 and 2 with a tilted partial table surface; and FIGS. 4*a* and 4*b* are partial side elevational views of one of the articulations used, illustrated in the folded-up state as shown in FIG. 1 or in the unfolded state as shown in FIG. 2.

DETAILED DESCRIPTION OF THE INVENTION

Figure 1:
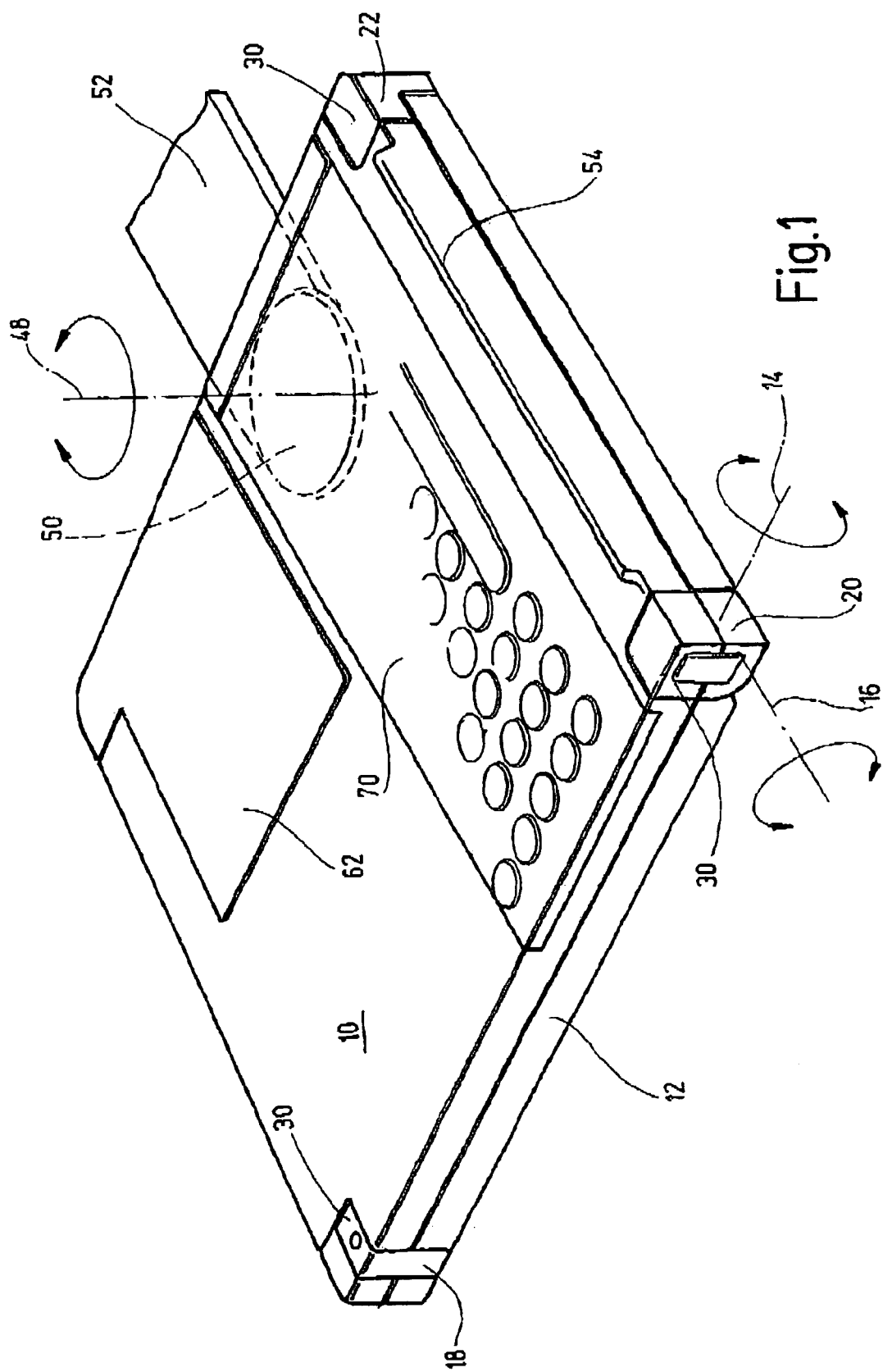
FIGS. 1 and 2 are perspective views of a table unit according to an embodiment of the present invention in the folded-up and unfolded states; respectively.

The table unit shown in the figures is to be used especially in the field of aircraft passenger seats. These table units can also be used in ferries, trains, long-distance busses or the like. The table unit has a first table element 10 which, as shown in FIG. 1, rests on the subjacent other or second table element 12. In the state shown in FIG. 1, the two table elements 10, 12 end essentially flush on top of one another to the outside and form an essentially square table surface. The two table elements 10, 12, as will be detailed below, can be rotated relative to one another around at least two swivelling axes first, second and third articulations 18, 20, 22 and can be fixed relative to one another in definable positions. The possible rotating or swivelling motions of the respective table elements 10, 12 around the two swivelling axes 14, 16 are indicated in FIG. 1 by double arrows. The two swivelling axes 14, 16 are perpendicular to one another and lie in the plane of the table. With the table unit extended, the axes extend from the arm rest or the like essentially horizontally.

Figure 2:
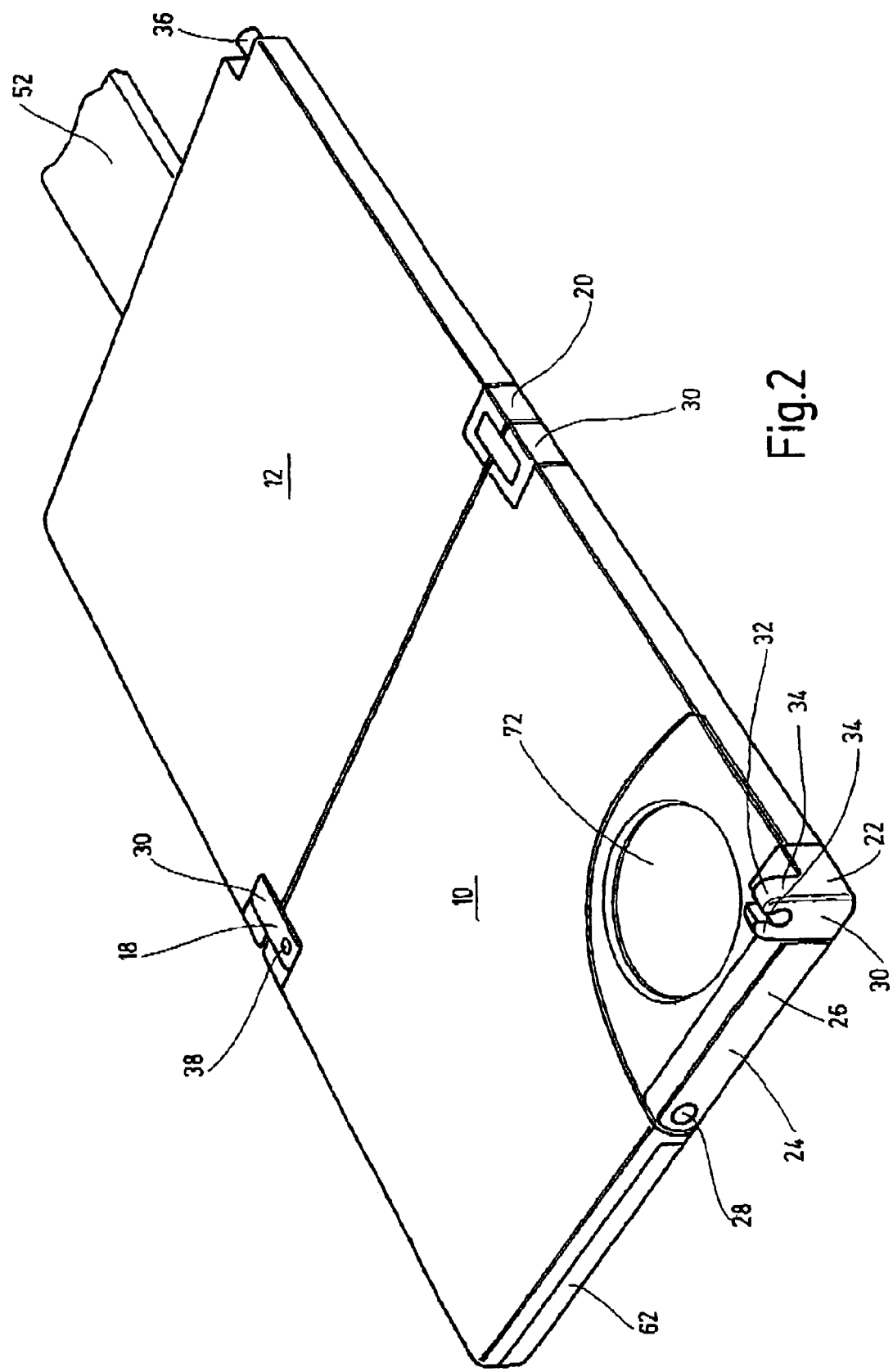

If the upper table element 10, viewed in the direction of FIG. 1, is swivelled counterclockwise around the first swivelling axis 14, the table unit assumes its unfolded position as shown FIG. 2. The two table elements 10, 12 are then next to one another forming essentially a rectangular table surface which corresponds preferably in its width to the width of the seat so that the individual in the neighboring seat in a row of aircraft passenger seats is not disturbed by the expanded table surface. In the unfolded state, the table unit is especially suited as a dining table, with food and beverages being easily accommodated on the table surface. The dining table function in this regard increases comfort when a seat user is eating.

The upper table element 10 can move clockwise about the second swivelling axis 16 from its flat horizontal position as shown in FIG. 1 into the tilted position as shown in FIG. 3. It can be fixed in this tilted position by a fixing means 24. In this embodiment, the fixing means 24 has a holder 26 which can be folded out in the position as shown in FIG. 2. In its initial position as shown in FIG. 2, holder 26 is held flush in the recess of the upper table element 10, which recess extends on the outside lateral periphery. The holder 26 is supported on the table element 10 to be able to rotate around a swivelling journal 28. When set up, for example, the holder can assume a position as shown by the broken lines in FIG. 3. In the tilted position of the table element 10, the free end of the holder 26 is supported on the top of the table element 12. By swivelling the holder 26 and moreover by adjusting the fixing means 24, the incline can be set and fixed according to the stipulations of the user in definable angular ranges. Instead of the holder 26, a fixing means 24 can also be implemented by a ratchet mechanism (not shown) in which at least the articulation 20 follows the tilt of the table element 10, and the articulation 20 retains its swivelled position as a result of the ratchet arrangement. The third articulation 22 can follow the movement of the ratchet by restricted guidance, and in this way can ensure the tilted adjustment of the table element 10.

As the aforementioned clearly shows, each swivelling axis 14, 16 is defined by two articulations or articulation pairs 18, 20 and 20, 22 at a time. The indicated articulations 18, and 22 are located at a right angle to one another on the outside periphery on the table unit. The articulation 20 is located in one corner between the two other articulations 18, 22. Thus, this middle articulation 20 is assigned both to first swivelling axis 14 and second swivelling axis 16. Preferably, for the unfolding and tilting motion of the table element 10, the articulation 20 is technically implemented as a so-called universal joint.

All articulations 18, 20, 22 have one articulation housing 30. For all articulations 18 and 22, the respective articulation housing 30 has a locking part 32 in the form of a locking clamp with two clamping clips 34. Each articulation housing 30 is comprised preferably of one elastically pliable plastic material to form a snap or clip locking part 32 detachably connected to a respective engagement part 36 in the manner of a connecting journal which remains on the respective table element, specifically the table element 12 (cf. FIGS. 2 and 3). The journal-like engagement part 36 for the first articulation 18 is located in a U-shaped recess 36 in the corner area of the table element 12. The engagement part 36 for the third articulation 22 in an angular recess likewise in another corner area of the table element 12 with its free end projecting into the vicinity. The engagement part 36 of the first articulation 18 extends especially within the first swivelling axis 14. The engagement part 36 of the third articulation 22 extends along second articulation axis 16. When the table elements 10 and 12 are folded apart into the position as shown in FIG. 2, swivelling motion tales place around the engagement part 36 of the first articulation 18. When setting the incline as shown in FIG. 3, swivelling motion takes place for the table element 10, around the journal-like engagement part 36 of the third articulation 22. The second articulation 20 is made as a multiple articulation following the pertinent swivelling or tilting motion.

In addition, the articulation housing 30 of the first articulation 18 has a driver 38 (FIG. 3) for the upper table element 10. In the unfolding motion from the position as shown in FIG. 1 into the position as shown in FIG. 2 by the driver 38, the respective articulation 30 is swivelled around the engagement part 36 of the first articulation 18, and consequently, around the other table element 12 until the two table elements 10, 12 with the two articulation housings 30 of the first articulation 18 and the second articulation 20 form the plane table surface. The driver 38, as shown especially by FIGS. 4a and 4b, is formed from a dome-shaped recess located in the center and lying in the vertical arrangement (cf. FIG. 4a) and also in the horizontal arrangement (cf. FIG. 4b) in one plane to the engagement part 36. For the indicated driver of the articulation housing 30 of the first articulation 18, the upper table element 10 on its side facing the articulation housing 30 is provided with a spring-loaded closing part 40.

If the table element 10 is now swivelled counterclockwise from its base position as shown in FIG. 4a upward, the closing part 40 disengages from the hemispherical recess 42 by the closing part 40 being moved in a direction out of the recess 42 and within the table element 10 against the force of the closing spring by forced guidance. During the continued unfolding motion, the closing part 40 slides along the arc-shaped contact surface 44 of the articulation 30 until the table element 10 with its lengthwise orientation is located perpendicular to the lower table element 12 (not shown). In this position the closing ball 40, spring-loaded, then locks with the driver 38, by both force-fit and form-fit, such that upon the continued unfolding motion of the table element 10 from its vertical position (not shown) into the horizontal unfolded position as shown in FIG. 2, the articulation housing 30 is entrained in the form of a swivelling motion counterclockwise around the engagement part 36 and consequently around the swivelling axis 14.

The unfolded position corresponds to the illustration as shown in FIG. 4b for the first articulation 18. In addition to the universal articulation 20, the table element 10 is fixed by the locked closing part 40 and by the articulation housing 30 of the first articulation 18 in a horizontal alignment on the other table element 12. The upper and lower table surfaces of the table element 10 and table element 12 then lie in one plane, with the outer sides along the lengthwise edges of the housing 30 of the first articulation 18. The arrangement for the second articulation 20 is kept in a comparable manner. The width or height of the articulation housings 30 for the first and second articulations 18 and 20 therefore corresponds essentially to the thickness of the table elements 10, 12. The swivelling-back motion takes place in reverse. After the closing part 40 engages the hemispherical recess 42, the housing 30 is moved back into its position as shown in FIG. 4a, such that the table element 10 has its bottom in contact with the top of the table element 12.

By another hemispherical rolling surface 46 of the articulation housing 30 of the first articulation 18, the motion forward and away is facilitated by this rolling surface 46 being able to slide down accordingly on the adjacent free face of the table element 12. In the unfolding motion, the third articulation 22, by its locking part 32, disengages from the respective engagement journal or part 36. Likewise, in the reverse sequence, locking takes place instead by the third articulation 22, if the two table elements 10, 12 are located on top of one another or the table element 10 is tilted about swivelling axis 16 clockwise relative to the horizontal. The articulation housing 30 of the third articulation 22 then swivels around the respective engagement journal 36.

Furthermore, the two table elements 10, 12 can be swivelled in each position relative to one another around a common axis 48 of rotation extending perpendicular to the two swivelling axes 14, 16. The axis 48 of rotation is part of a turntable 50 (cf. FIG. 1) by which the two table elements 10, 12 are pivotally coupled to the table arm 52. The turntable rotation is indicated by the double arrows. By the table arm 52, the table unit can then, for example, be housed in the armrest of the vehicle seat or can be located on the back of the front seat with the capacity to be folded down. Preferably, the table arm 52, like the table elements 10, 12, is made of a durable plastic material. For reasons of saving space, the turntable 50 is an integral part of the lower table element 12, and is integrated flush in its table surface together with parts of the table arm 52. Accordingly, on either side of the turntable 50, free spaces are provided in the table element 12 in order not to hinder rotary or swivelling motion around the axis 48 of rotation.

As FIGS. 1 to 3 show in particular, a host of table functions are integrated in the table elements 10, 12. These working examples can be varied accordingly. Especially advantageously, a projecting lip 54 is provided, for example, as a support for a book, magazine or the like between the two articulations 20 and 22 on the top of the table element. A computer unit 56, for example, in the form of a conventional pocket calculator or a so-called notebook may be superposed on the top of the table element. The input keyboard 58 also can provide a writing function implemented by a display or the like. Viewed in the direction of FIGS. 1 and 3, a vanity mirror 60 covered by an unfolding cover 62 is provided above keyboard 58. The cover 62 can be housed flush in the table element 10 by a snap or clip connection 64.

To achieve a plane table surface, the vanity mirror 60 is located set recessed within the table element 10. Within the essentially rectangular cover 62, on its inside facing the vanity mirror 60, preferably in an outside area facing the user, a recessed storage area 66 can be provided. The lengthwise orientation of the recessed storage area 66 extends parallel to the unfolding axis 68 of the cover 62. The unfolding axis 68 is also parallel to the swivelling axis 16. Preferably, the free path of motion of the cover 62 is limited to a certain angular degree, for example, 120°. Preferably, for a tilted table element 10, the cover 62 with the storage area 66 should be located essentially in a horizontal plane extending parallel to the table surface of the table element 12. The computer unit 56 has the pertinent shell-like, preferably partially transparent cover 70.

As FIG. 2 also shows, for example, on the bottom of the table element 10 a circular recess 72 setting glasses and cups. The recess 72 can be deepened such that there is edge-side encirclement for glasses and cups in their bottom area to enable secure holding for the food in question, thus especially on a rough trip, for example when encountering turbulence. This holding possibility can be optically delineated relative to the remaining surface of the table element 10. The holding recess 72 can empty to the outside into the area of the holder 26 which ends flush with the outside peripheral surface of the table element 10. The holder 26, with its free end, can engage the facing end of the articulation housing 30 of the third articulation 22 if, as shown in FIG. 2, the holder is folded into the table element 10. Its raised position is shown in FIG. 3 for a definable tilt angle. Integration of other table functions would be conceivable, for example, a call indicator for onboard service or the like. Especially with the very restricted space available aboard aircraft or the like, the multifunctional tables of the present invention represent a clear improvement of comfort.

While one embodiment has been chosen to illustrate the invention, it will be understood by those skilled in the art that various changes and modifications can be made therein without departing from the scope of the invention as defined in the appended claims.

The invention claimed is:

1. A table unit for vehicle seats, comprising:
   a first table element having a first table function;
   a second table element having a second table function; and
   first, second and third articulations coupling said first and second table elements for rotation relative to one another about first and second axes and fixing said table elements in definable relative positions, said articulations being located on outside lateral peripheries of said table elements, said second articulation being a multiple joint allowing rotation about said first and second axes.

2. A table unit according to claim 1 wherein
   said first and second table elements can be rotated about said first axis relative to one another between a superposed position with said first table element flush on top of said second table element and a flat position with said table elements being unfolded horizontally next to one another.

3. A table unit according to claim 1 wherein
   said first and second table elements are tiltable relative to one another by rotation about said second axis; and
   a fixing means secures said first and second table elements in a definable tilt position.

4. A table unit according to claim 1 wherein
   said articulations are located in corner areas of said table elements.

5. A table unit according to claim 1 wherein
   said first, second and third articulations comprise first, second and third housings, respectively; and said first articulation comprises a locking part on one of said table elements and an engagement part on the other of said table elements detectably connected to said locking part.

6. A table unit according to claim 5 wherein
at least said first housing comprises a driver swiveling said first housing around said engagement part during movement of said table elements from a superposed position with said first table element superposed on top of said second table element until said table elements move to a flat position forming a plane table surface with said first housing.

7. A table unit according to claim 1 wherein
said table elements can be swiveled about a third axis which is perpendicular to said first and second axes.

8. A table unit according to claim 1 wherein
said first and second table functions are different.

9. A table unit according to claim 8 wherein
one of said table elements comprises a make-up area.

10. A table unit according to claim 8 wherein
one of said table elements comprises a computer unit.

11. A table unit according to claim 8 wherein
one of said table elements comprises a food holder.

12. A table unit according to claim 8 wherein
one of said table elements comprises a reading matter holder.

13. A table unit according to claim 8 wherein
said table functions are integrated in the respective table element; and
a cover extends over at least one of said functions to form part of a plane table surface formed by said table elements.

14. A table unit according to claim 1 wherein
each of said first and third articulations comprises a locking part on one of said table elements and an engagement part on the other of said table elements detachably coupled to the respective locking part, each of said locking parts being rotatably coupled to the respective engagement part.

15. A table unit according to claim 14 wherein
said first and second table elements are rectangular;
first and third articulations are located at diagonally opposite corners of said table elements; and
said second articulation is located at a corner of said table elements located between said first and second articulations.

16. A table unit according to claim 1 wherein
said first and second axes are angularly oriented.

17. A table unit according to claim 1 wherein
said first and second axes are perpendicular to one another.

* * * * *